United States Patent
Williams et al.

[11] Patent Number: 6,152,848
[45] Date of Patent: Nov. 28, 2000

[54] SHIFT-ON-MOVE RANGE SYSTEM FOR FULL-TIME TRANSFER CASE

[75] Inventors: Randolph C. Williams, Weedsport; Nancy Mintonye, Kirkville, both of N.Y.

[73] Assignee: New Venture Gear, Inc., Troy, Mich.

[21] Appl. No.: 09/396,927

[22] Filed: Sep. 15, 1999

[51] Int. Cl.[7] .................................................. F16H 48/06
[52] U.S. Cl. ............................................................ 475/204
[58] Field of Search .................................... 475/202, 204, 475/206; 180/248, 249, 250

[56] References Cited

U.S. PATENT DOCUMENTS

| | | |
|---|---|---|
| 4,569,252 | 2/1986 | Harper . |
| 4,667,538 | 5/1987 | Larsson . |
| 5,054,335 | 10/1991 | Andrews . |
| 5,346,442 | 9/1994 | Eastman . |
| 5,390,347 | 2/1995 | Buri et al. . |
| 5,651,749 | 7/1997 | Wilson et al. . |
| 5,655,986 | 8/1997 | Wilson et al. . |
| 5,688,202 | 11/1997 | Bowen . |
| 5,697,861 | 12/1997 | Wilson . |
| 5,700,222 | 12/1997 | Bowen . |
| 5,702,321 | 12/1997 | Bakowski et al. . |
| 5,704,867 | 1/1998 | Bowen . |
| 5,720,688 | 2/1998 | Wilson et al. . |
| 5,836,847 | 11/1998 | Pritchard . |
| 5,902,205 | 5/1999 | Williams . |
| 5,911,644 | 6/1999 | Williams . |
| 5,947,858 | 9/1999 | Williams . |
| 5,951,429 | 9/1999 | Eastman . |
| 6,022,289 | 2/2000 | Francis .................................. 475/204 |

*Primary Examiner*—Dirk Wright
*Attorney, Agent, or Firm*—Harness, Dickey & Pierce, P.L.C.

[57] ABSTRACT

A transfer case for a four-wheel drive vehicle having a planetary gear assembly which integrates a gear reduction unit and an interaxle differential into a common assembly. A synchronized range clutch is operably associated with the input to the planetary gear assembly and can be selectively shifted on-the-fly for establishing high-range and low-range speed ratios. A synchronized mode clutch is operably associated with the output of the planetary gear assembly and can be selectively shifted on-the-fly for establishing two-wheel, full-time four-wheel and locked four-wheel drive modes.

23 Claims, 5 Drawing Sheets

| MODE | RANGE SLEEVE (9Z) | FIRST MODE SLEEVE (140) | SECOND MODE SLEEVE (144) |
|---|---|---|---|
| 2WD-H | H | 2WD | OPEN |
| 4DIFF-H | H | 4WD | OPEN |
| 4LOCK-H | H | 4WD | LOCK |
| 4LOCK-L | L | 4WD | LOCK |
| 4DIFF-L | L | 4WD | OPEN |
| 2WD-L | L | 2WD | OPEN |
| NEUTRAL | N | 2WD | OPEN |

*Figure - 5*

SHIFT-ON-MOVE RANGE SYSTEM FOR FULL-TIME TRANSFER CASE

BACKGROUND OF THE INVENTION

The present invention relates generally to transfer cases for use in four-wheel drive vehicles. More particularly, the present invention relates to a full-time transfer case having a two-speed gear reduction unit and an interaxle differential integrated into a planetary gear assembly and a synchronized range shift mechanism for shifting between high-range and low-range drive modes.

As is now conventional, many light-duty and sport-utility vehicles are equipped with a transfer case for transmitting drive torque to all four of the wheels, thereby establishing a four-wheel drive mode of operation. To accommodate differing road surfaces and conditions, many transfer cases are equipped with a gear reduction unit which can be selectively shifted to permit the vehicle operator to choose between a four-wheel high-range (i.e., direct ratio) drive mode and a four-wheel low-range (i.e., reduced ratio) drive mode. In many instances, the four-wheel drive vehicle must be stopped before the transfer case can be shifted between its four-wheel high-range and low-range drive modes. Unfortunately, the need to stop the vehicle prior to shifting between the available four-wheel high-range and low-range drive modes is inconvenient, particularly upon encountering road conditions or surface terrains where continuation of the vehicle's rolling momentum would assist in overcoming the conditions encountered. To alleviate a portion of this inconvenience, some gear reduction units have been designed which permit the vehicle operator to shift without stopping the vehicle (i.e., "on-the-move") from the four-wheel low-range drive mode into the four-wheel high-range drive mode. For example, U.S. Pat. No. 5,054,335 discloses a transfer case equipped with a synchronized range shift arrangement for a layshaft-type gear reduction unit. Alternatively, commonly-owned U.S. Pat. No. 5,346,442 discloses a transfer case having a synchronized range shift arrangement for a planetary-type gear reduction unit. Finally, U.S. Pat. No. 4,569,252 discloses a planetary-type gear reduction unit which permits synchronized shifting into and out of the high-range drive mode and the low-range drive mode.

In addition to the gear reduction unit, many transfer cases are also equipped with a mode shift mechanism which permits the vehicle operator to selectively shift between a two-wheel drive mode wherein only the primary driveline is driven and a "part-time" four-wheel drive mode wherein the secondary driveline is rigidly coupled to the primary driveline. Reference may be made to commonly-owned U.S. Pat. No. 4,770,280 for disclosure of an exemplary part-time transfer case equipped with a gear reduction unit and a synchronized mode shift mechanism. In view of increased consumer popularity in four-wheel drive vehicles for everyday use, the mode shift mechanism in some two-speed transfer cases is replaced with an interaxle differential which is operable for continuously transmitting drive torque to both the front and rear drivelines while permitting speed differentiation therebetween. Reference may be made to commonly-owned U.S. Pat. No. 4,677,873 for disclosure of an exemplary full-time two-speed transfer case equipped with a gear reduction unit and a dual-planetary interaxle differential. In order to prevent traction loss due to excessive interaxle slip, some full-time transfer cases are also equipped with a limited slip device which is operable for selectively locking or automatically biasing the torque distribution ratio across the interaxle differential while preventing or regulating speed differentiation in response to the slip condition. In some systems, a lock-out clutch is manually-actuated to lock the interaxle differential. However, other full-time transfer cases are equipped with a hydraulic coupling or an electronically-controlled biasing clutch for automatically regulating the amount of allowable speed differentiation across the interaxle differential.

In an effort to minimize the overall size of full-time transfer cases, it has been proposed to incorporate the gear reduction unit and the interaxle differential into a common planetary gear assembly. One such arrangement is described in U.S. Pat. No. 4,644,822 which discloses a transfer case having "back-to-back" first and second planetary gearsets with common components that can be selectively shifted to establish different four-wheel drive modes. Likewise, each of commonly-owned U.S. Pat. Nos. 5,284,068 and 5,411,447 discloses a full-time two-speed transfer case equipped with an integrated planetary gear assembly that is shifted as a unit to establish the different available drive modes. Finally, U.S. Pat. Nos. 4,677,875, 4,344,335, 4,215,593 and 4,805,484 each disclose a transfer case having a common planetary gear assembly which is operable to establish various drive modes through manipulation of one or more suitable shift mechanisms. While such prior art arrangements attempt to provide a compact construction, there is a continuing need to develop low cost, simplified alternatives which meet modern requirements for low noise and weight while reducing the overall length of the transfer case.

SUMMARY OF THE INVENTION

It is therefore an object of the present invention to provide a transfer case for a full-time four-wheel drive vehicle having a planetary gear assembly which integrates a gear reduction unit and an interaxle differential into a common arrangement.

As an additional object, the transfer case includes a range shift mechanism which is operably associated with the input of the planetary gear assembly and which can be selectively actuated for establishing a full-time four-wheel high-range drive mode, a neutral mode, and a full-time four-wheel low-range drive mode.

As a related object of the present invention, a synchronized range shift mechanism is provided for permitting "on-the-fly" shifting of the transfer case between the full-time four-wheel high-range and low-range drive modes.

According to another object of the present invention, the transfer case includes a mode shift mechanism which is operable in conjunction with the outputs of the planetary gear assembly and which can be selectively actuated for establishing a locked four-wheel high-range drive mode, a locked four-wheel low-range drive mode, and a two-wheel high-range drive mode.

As a related object, a synchronized mode shift mechanism is provided for permitting on-the-fly shifting of the transfer case between the two-wheel drive high-range drive mode and the full-time four-wheel high-range drive mode when the front driveline is equipped with an axle disconnect mechanism.

According to a preferred embodiment of the present invention, the planetary gear assembly is operably installed between an input shaft and front and rear output shafts of the transfer case and is constructed in a compact arrangement. The planetary gear assembly includes a first planetary gearset and a second planetary gearset which are interconnected by a common carrier assembly. The first planetary gearset is operably installed between the input shaft and the second planetary gearset for driving the carrier assembly at either of a first speed ratio (i.e., "high-range") or a second speed ratio (i.e., "low-range") relative to the input shaft. The common carrier assembly acts as the input to the second planetary gearset which has first and second outputs respectively connected to the rear and front output shafts of the transfer case. Thus, the second planetary gearset is operable for permitting speed differentiation and distributing drive torque between the front and rear output shafts of the transfer case. A synchronized range shift mechanism is provided which includes a range clutch operable in a first range position for coupling first and second components of the first planetary gearset for common rotation with the input shaft for establishing the four-wheel high-range drive mode. The range clutch is operable in a second range position for coupling the first component of the first planetary gearset to the transfer case housing for establishing the four-wheel low-range drive mode. Finally, the range clutch is operable in a third range position to disconnect the first component of the first planetary gearset from the input shaft and transfer case housing for establishing a Neutral mode.

As an additional feature, the transfer case further includes a mode shift mechanism having a mode clutch which can be actuated to establish three distinct drive modes. In particular, the mode clutch is operable to couple the second output of the second planetary gearset to the front output shaft while permitting relative rotation between the first and second outputs of the second planetary gearset for establishing a full-time four-wheel drive mode. The mode clutch is further operable to couple the second output of the second planetary gearset for common rotation with the front and rear output shafts, thereby inhibiting relative rotation between the front and rear output shafts and establishing a locked four-wheel drive mode. Finally, the mode clutch is operable to uncoupled the second output of the second planetary gearset from the front and rear output shafts such that all drive torque is transmitted to the rear output shaft, thereby establishing a two-wheel drive mode.

Additional objects, features and advantages of the present invention will become apparent from studying the following detailed description and appended claims when taken in conjunction with the accompanying drawings.

DETAILED DESCRIPTION OF THE PREFERRED EMBODIMENTS

In general, the present invention relates to the combination of a gear reduction unit and an interaxle differential in an "integrated" planetary gear assembly. Preferably, the integrated planetary gear assembly is installed in the transfer case of a four-wheel drive motor vehicle for establishing several different combinations of speed ranges and drive modes. A synchronized range shift mechanism is operably associated with the input of the integrated planetary gear assembly for permitting "onthe-move" range shifting of the transfer case between a low-range speed ratio and a high-range speed ratio during motive operation of the motor vehicle. Additionally, a synchronized mode shift mechanism is operably associated with the outputs of the integrated planetary gear assembly for permitting "on-the-fly" mode shifting of the transfer case between a full-time (i.e., differentiated) four-wheel drive mode, a locked (i.e., non-differentiated) four-wheel drive mode, and a two-wheel drive mode.

Figure 1:
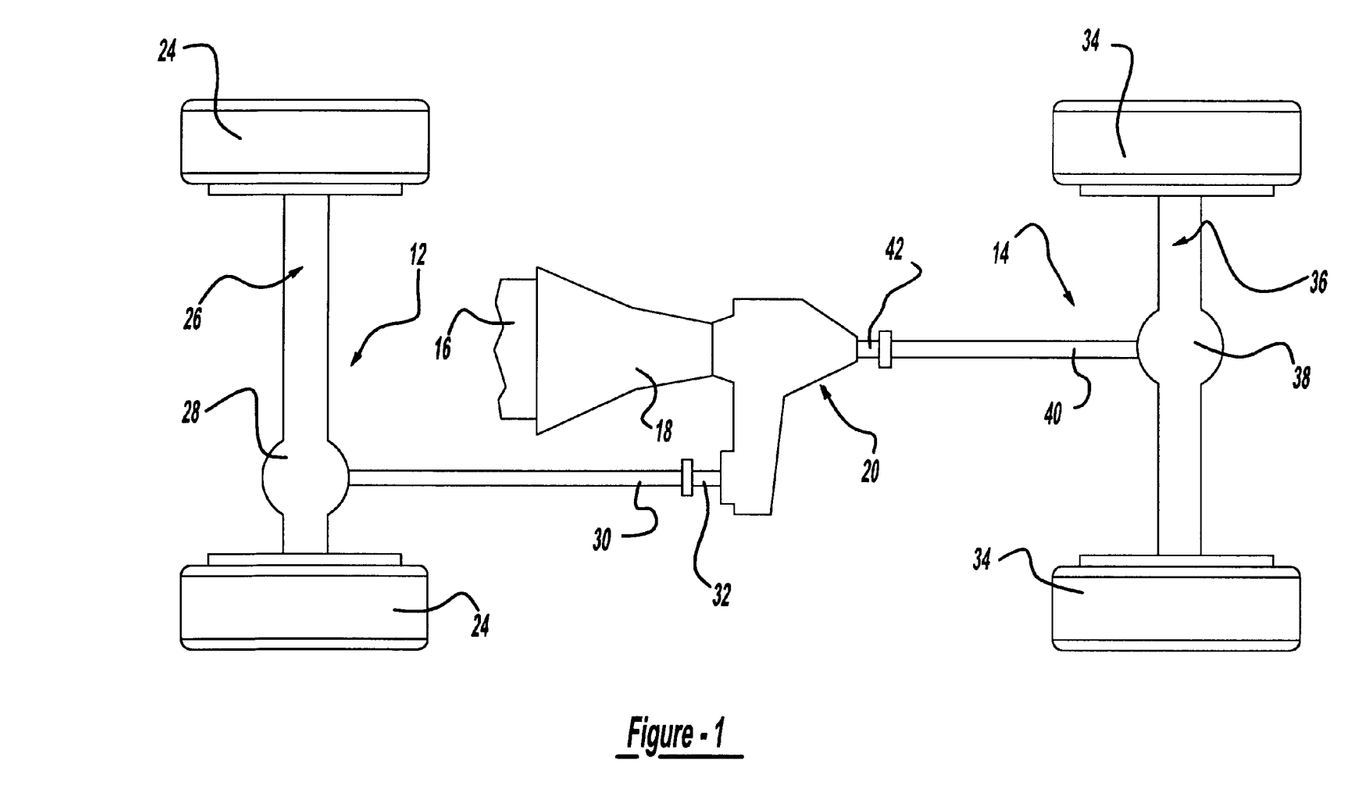
FIG. 1 illustrates the drivetrain of a four-wheel drive motor vehicle equipped with the transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a full-time four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear propshaft 40, the opposite end of which is interconnected to a rear output shaft 42 of transfer case 20.

Figure 2:
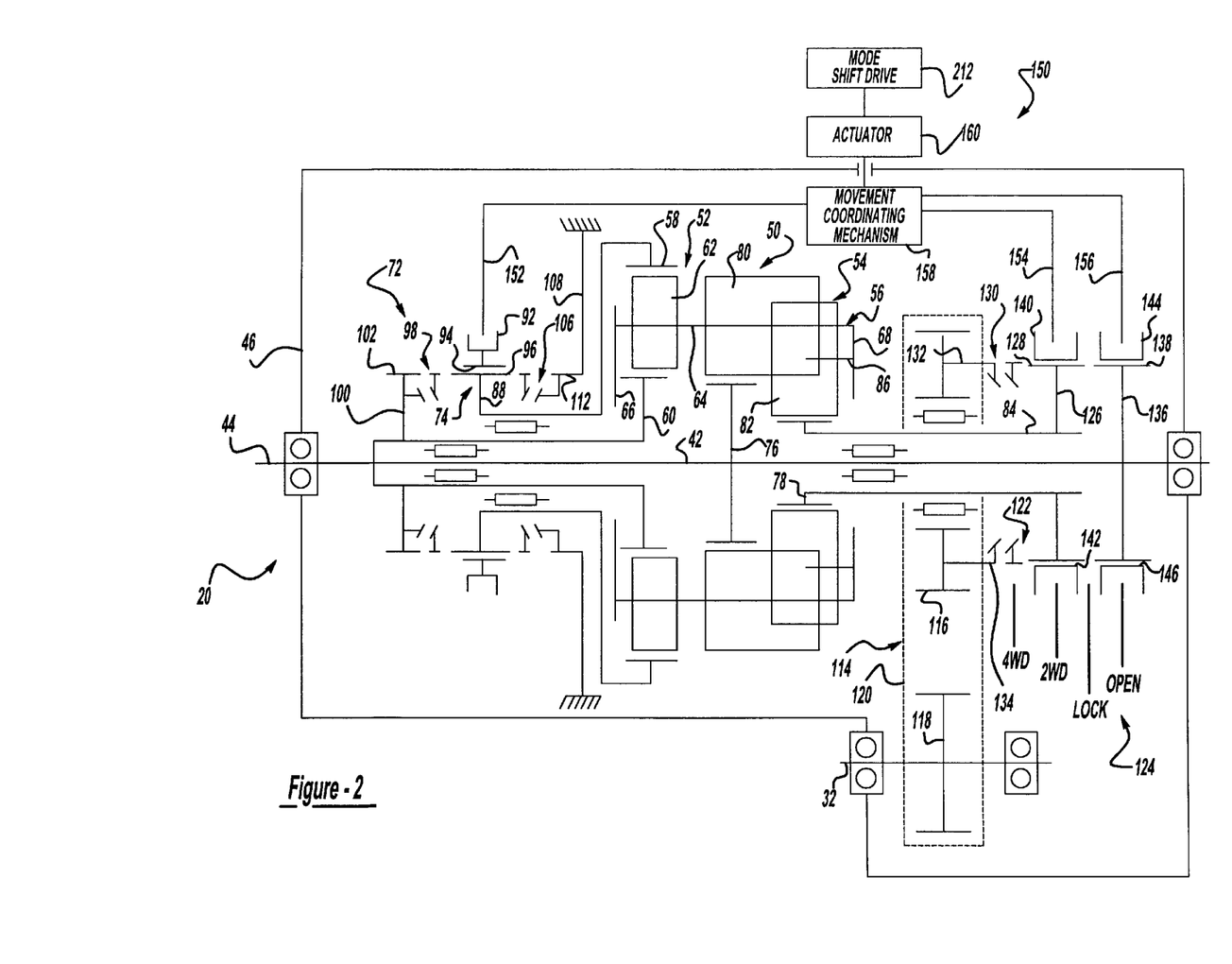
FIG. 2 is a schematic drawing of the transfer case of the present invention.
Figure 3:
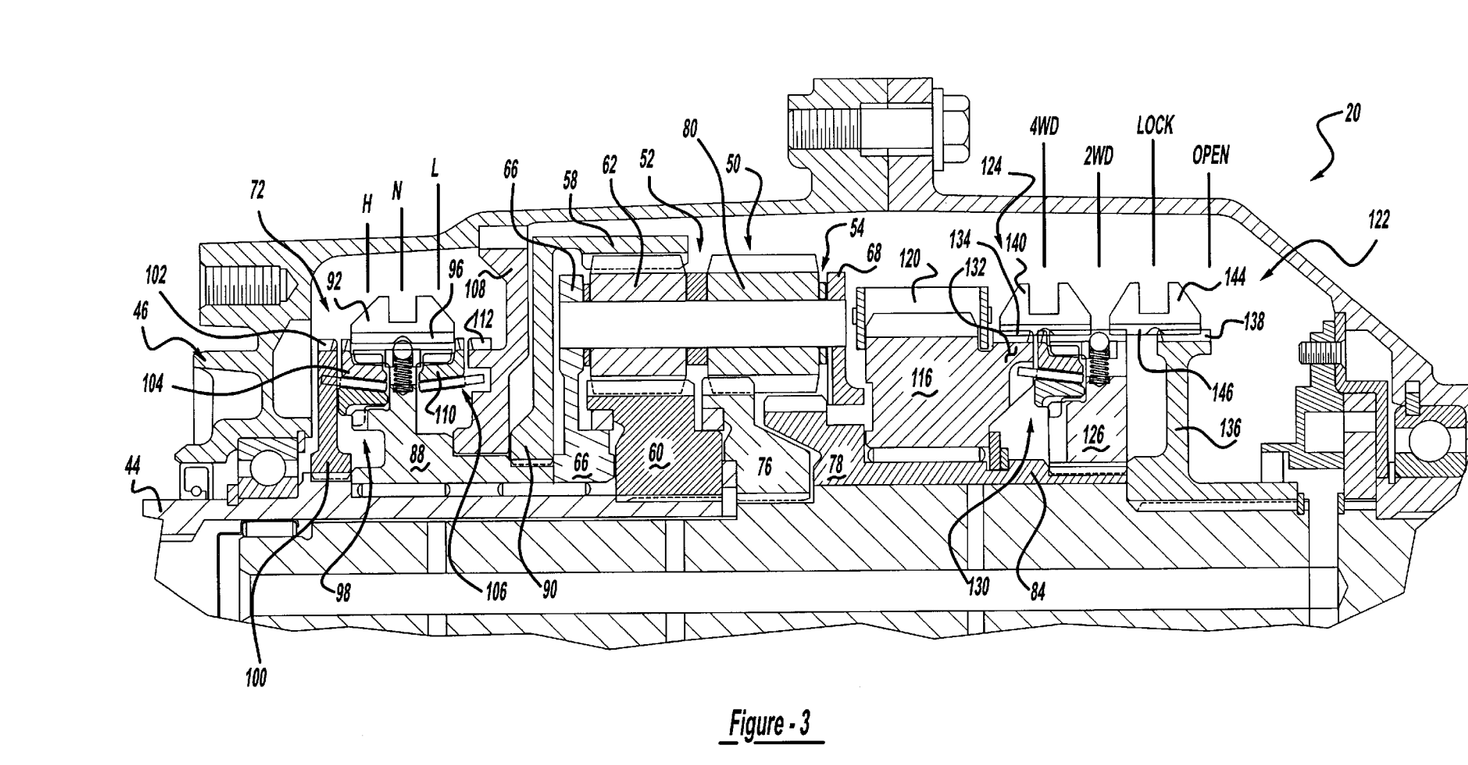
FIG. 3 is a partial sectional view of a transfer case based on the schematic drawing of FIG. 2.

With particular reference to FIGS. 2 and 3 of the drawings, transfer case 20 is shown to include an input shaft 44 which is rotatably supported in a housing 46. Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46. Transfer case 20 is also shown to include a planetary gear assembly 50 which is operably installed between input shaft 44 and front and rear output shafts 32 and 42, respectively. Planetary gear assembly 50 includes a first gearset 52 and a second gearset 54 interconnected by a common carrier assembly 56. First gearset 52 is a simple planetary gear assembly including a ring gear 58, a first sun gear 60, and a set of first pinion gears 62 which are each rotatably supported on a pinion shaft 64 and meshed with first sun gear 60 and ring gear 58. Each pinion shaft 64 extends between a front carrier ring 66 and a rear carrier ring 68 which are interconnected to define carrier assembly 56. First sun gear 60 is fixed (i.e., splined) to input shaft 44 which is rotatably supported on rear output shaft 42.

As will be detailed hereinafter, first gearset 52 functions as a two-speed gear reduction unit which, in conjunction with a range clutch 72 of a synchronized range shift mechanism 74, is operable to establish a first or high-range speed ratio drive connection between input shaft 44 and carrier assembly 56 by coupling ring gear for common rotation with first sun gear 60. Likewise, a second or low-range speed ratio drive connection is established between input shaft 44 and carrier assembly 56 by coupling ring gear 58 to transfer case housing 46 for braking ring gear 58. A Neutral mode is established when ring gear 58 is uncoupled from both input shaft 44 and transfer case housing 46.

With continued reference to FIGS. 2 and 3, second gearset 54 is shown as a dual-planetary gear assembly which functions as an interaxle differential to permit speed differentiation and distribute drive torque between front output shaft 32 and rear output shaft 42. As will be detailed, carrier assembly 56, when driven at either of the high-range or low-range speed ratios, acts as the input of second gearset 54 which has its outputs coupled to front output shaft 32 and rear output shaft 42. In particular, second gearset 54 includes a second sun gear 76, a third sun gear 78, a set of second pinion gears 80 each meshed with second sun gear 76, and a set of third pinion gears 82 each meshed with a corresponding one of second pinion gears 80 as well as with third sun gear 78. According to the embodiment shown, second sun gear 76 acts as a first output of second gearset 54 and is coupled (i.e., splined) for rotation with rear output shaft 42. Likewise, third sun gear 78 acts as a second output of second gearset 54 and is shown integral with a transfer shaft 84 which is supported for rotation relative to rear output shaft 42. In addition, each second pinion gear 80 is rotatably supported on pinion shaft 64, the opposite ends of which are, as noted, mounted in front and rear carrier rings 66 and 68, respectively, of carrier assembly 56. Similarly, each third pinion gear 82 is rotatably supported on a pinion shaft 86, the opposite end of which are likewise mounted in front and rear carrier rings 66 and 68, respectively.

To provide means for selectively establishing the high-range and low-range drive connections between input shaft 44 and carrier assembly 56, synchronized range shift mechanism 74 is provided in conjunction with first gearset 52. As noted, synchronized range shift mechanism 74 is operable for permitting transfer case 20 to be shifted "on-the-move" between its high-range and low-range drive modes. As also noted previously, synchronized range shift mechanism 74 includes range clutch 72 which is operable for selectively coupling ring gear 58 to either of input shaft 44 or transfer case housing 46. In particular, range clutch 72 includes a neutral hub 88 that is rotatably supported on input shaft 44. Ring gear 58 includes a support plate segment 90 which is fixed (i.e., splined) for rotation with neutral hub 88. Range clutch 72 further includes a range sleeve 92 having internal splines 94 that are in constant mesh with external splines 96 on neutral hub 88. Thus, range sleeve 92 is mounted for rotation with and axial sliding movement relative to neutral hub 88 such that its splines 94 remain engaged with splines 96 on neutral hub 88 in all range positions.

Range clutch 72 also includes a first synchronizer assembly 98 operably located between neutral hub 88 and a clutch plate 100 which is fixed to input shaft 44. Clutch plate 100 has external clutch teeth 102 formed thereon. First synchronizer assembly 98 is operable for causing speed synchronization between input shaft 44 and neutral hub 88 in response to movement of range sleeve 92 from a neutral position (denoted by position line "N") shown toward a high-range position (denoted by position line "H"). Once the speed synchronization process is completed, range sleeve 92 is permitted to move through a first blocker ring 104 and into coupled engagement with clutch plate 100 such that its splines 94 meshingly engage clutch teeth 102. As noted, range sleeve 92 remains engaged with neutral hub 88 in addition to engaging clutch plate 100. Accordingly, with range sleeve 92 positioned in its H position, clutch plate 100 is coupled to neutral hub 88 such that ring gear 58 is coupled to rotate at the same speed as input shaft 44. With ring gear 58 and first sun gear 60 both coupled for common rotation with input shaft 44, first pinions 62 are prevented from rotating on their axes, thereby forcing carrier assembly 56 to rotate as a unit with input shaft 44, thus establishing the high-range drive connection.

Range clutch apparatus 72 further includes a second synchronizer assembly 106 operably disposed between neutral hub 88 and a stationary brake plate 108 fixed (i.e., splined) to transfer case housing 46. Second synchronizer assembly 106 is operable for causing speed synchronization between brake plate 108 and neutral hub 88 in response to movement of range sleeve 92 from its N position toward a low-range position (denoted by position line "L"). Once speed synchronization is complete, range sleeve 92 is permitted to move through a second blocker ring 110 and into coupled engagement with brake plate 108 such that its splines 94 meshingly engage clutch teeth 112 on brake plate 108. The coupling of brake plate 108 and neutral hub 88 results in a ring gear 58 being held stationary. With range sleeve 92 positioned in its L position, first sun gear 60 drives first pinion gears 62 about stationary ring gear 58 such that carrier assembly 56 is driven at a reduced speed ratio relative to input shaft 44, thereby establishing the low-range drive connection. First synchronizer assembly 98 and second synchronizer assembly 106 can be any conventional construction such as, for example, single-cone or dual-cone arrangements. Thus, it will be appreciated by those skilled in the art that any type of suitable synchronizer arrangement can be used for facilitating speed synchronization between the components that are to be directly coupled.

Range sleeve 92 is shown in its Neutral position (denoted by position line "N") whereat its splines 94 are released from engagement with clutch teeth 102 on clutch plate 100 and teeth 112 on brake plate 108 and yet are engaged with splines 96 on neutral hub 88. As such, driven rotation of input shaft 44 causes rotation of first sun gear 60 and first pinions 62 about their axes while carrier 56 remains stationary. Thus, first pinions 62 cause rotation of ring gear 58 and neutral hub 88. Since range sleeve 92 does not couple neutral shaft 88 to either clutch plate 100 or brake plate 108 when it is in its N position, no drive torque is transferred through carrier assembly 56 to front and rear output shafts 32 and 42, respectively, thereby establishing the Neutral non-driven mode.

As noted, second gearset 54 functions as the interaxle differential. Specifically, carrier assembly 56 is its input member while second sun gear 76 and third sun gear 78 are its output members. Thus, driven rotation of carrier assembly 56 causes a predetermined torque split (i.e., distribution ratio) to be transmitted to rear output shaft 42 through second sun gear 76 and to transfer shaft 84 through third sun gear 78. As seen, a transfer assembly 114 is provided for selectively transferring drive torque from transfer shaft 84 to front output shaft 32. Transfer assembly 114 includes a drive sprocket 116 rotatably supported on transfer shaft 84, a driven sprocket 118 fixed to front output shaft 32, and a continuous chain 120 interconnecting driven sprocket 118 to drive sprocket 116.

To provide means for selectively establishing at least three different drive connections between second gearset 54 and front and rear output shafts 32 and 42, respectively, transfer case 20 includes a synchronized mode shift mechanism 122. Synchronized mode shift mechanism 122 includes a mode clutch 124 which is operable for selectively coupling transfer shaft 84 to drive sprocket 116 for establishing a differentiated (i.e., "full-time") four-wheel drive mode in which speed differentiation is permitted between front output shaft 32 and rear output shaft 42. Mode clutch 124 is also operable for selectively coupling transfer shaft 84 to drive sprocket 116 and rear output shaft 42 for establishing a non-differentiated (i.e, "locked") four-wheel drive mode in which speed differentiation is inhibited between front output shaft 32 and rear output shaft 42. Finally, mode clutch 124 is operable for selectively uncoupling drive sprocket 116 from transfer shaft 84 for establishing a two-wheel drive mode in which all drive torque is delivered to rear output shaft 42. As will be detailed, mode shift mechanism 122 utilizes a synchronizer assembly for permitting "on-the-fly" mode shifts between the two-wheel and four-wheel drive modes. Drive sprocket 116 is rotatably supported on transfer shaft 84 since, in the preferred embodiment disclosed, synchronized mode shift mechanism 122 is provided for permitting selective disengagement of drive sprocket 116 from transfer shaft 84 to establish the two-wheel drive mode in addition to the available full-time and locked four-wheel drive modes.

Mode clutch 124 includes a clutch hub 126 fixed (i.e., splined) to transfer shaft 84 and having an outer cylindrical rim on which external splines 128 are formed, a mode synchronizer assembly 130, a first clutch plate 132 fixed to drive sprocket 116 and having external clutch teeth 134 formed thereon, and a second clutch plate 136 fixed to rear output shaft 42 having an outer cylindrical rim with clutch teeth 138 formed thereon. Mode clutch 124 also includes a first mode sleeve 140 having internal splines 142 and a second mode sleeve 144 having internal splines 146. Splines 142 of first mode sleeve 140 are in constant mesh with external spline 128 of clutch hub 126 such that first mode sleeve 140 can be slid axially relative thereto. Mode synchronizer assembly 130 is disposed between clutch hub 126 and first clutch plate 132 and is operable for causing speed synchronization between hub 126 and first clutch plate 132 in response to movement of first mode sleeve 140 from a two-wheel drive position (denoted by the "2WD" position line) to a four-wheel drive position (denoted by the "4WD" position line). Once speed synchronization is complete, first mode sleeve 140 is permitted to move through a mode blocker ring 148 and into coupled engagement with first clutch plate 132 such that its splines 142 also mesh with clutch teeth 134. Internal splines 146 of second mode sleeve 144 are in constant mesh with clutch teeth 138 on second clutch plate 136 such that second mode sleeve 144 can be slid axially relative thereto. Second mode sleeve 144 is axially movable relative to second clutch plate 136 between a locked position (denoted by the "LOCK" position line) and a released position (denoted by the "OPEN" position line). With second mode sleeve 144 in its LOCK position, its splines 146 also mesh with splines 128 on clutch hub 126 for coupling transfer shaft 84 to rear output shaft 42. Conversely, movement of second mode sleeve 144 to its OPEN position causes its splines 146 to disengage splines 128 on clutch hub 126 for permitting relative rotation between transfer shaft 84 and rear output shaft 42.

Figure 4:
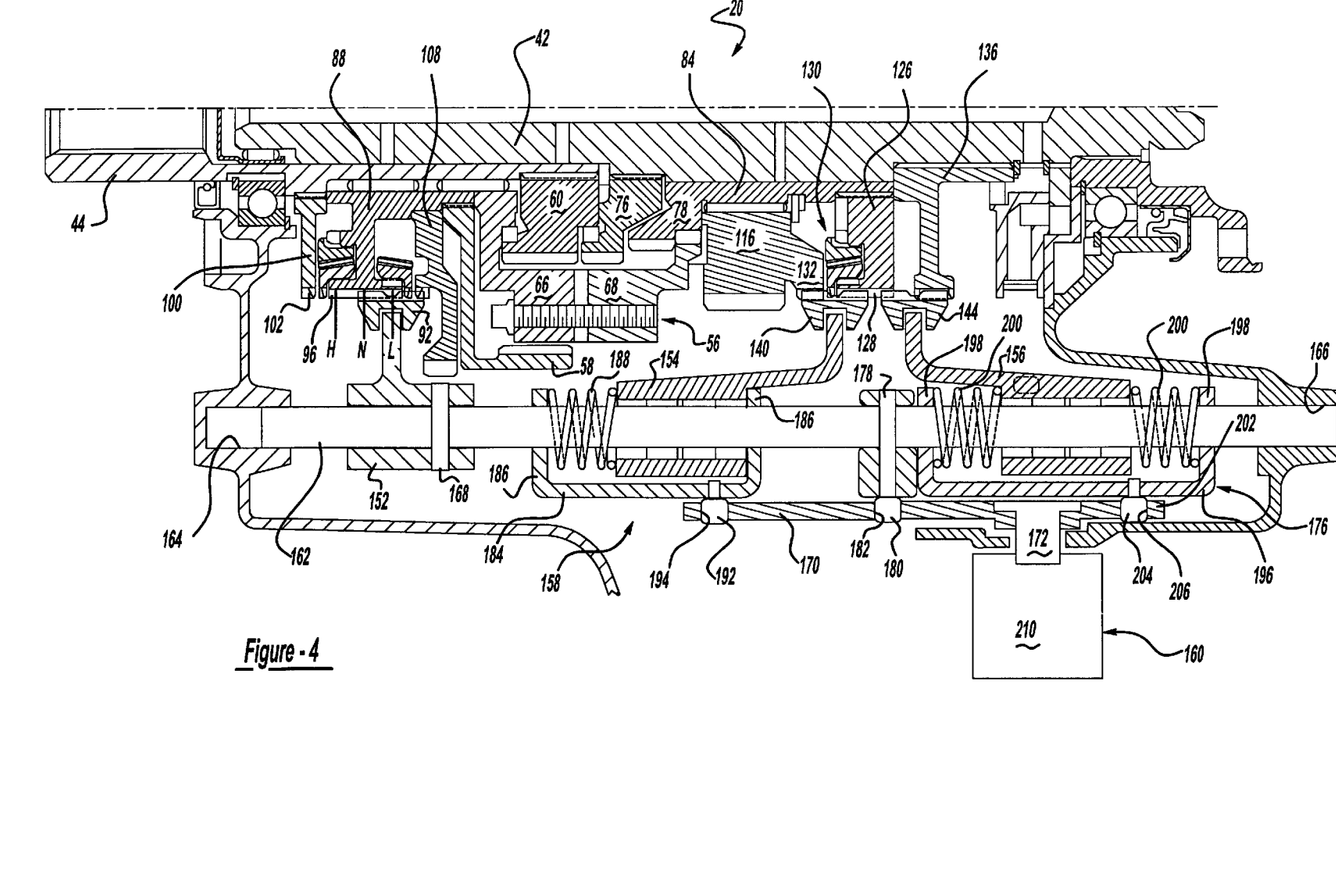
FIG. 4 is a partial sectional view of a shift system for the transfer case shown in FIG. 2.

Referring now to FIGS. 2 and 4, a shift system 150 associated with transfer case 20 is shown to include a range fork 152 coupled to range sleeve 92, a first mode fork 154 coupled to first mode sleeve 140, a second mode fork 156 coupled to second mode sleeve 144, a movement coordinating mechanism 158, and an actuator 160. Range fork 152 is mounted on a shift rail 162 which is supported in housing sockets 164 and 166 for sliding movement. Range fork 152 is fixed via pin 168 to rail 162 for fore and aft sliding movement therewith. First mode fork 154 and second mode fork 156 are journally supported on rail 162. Movement coordinating mechanism 158 includes a sector plate 170 fixed to a rotatably actuator shaft 172, a first spring-biased shift assembly 174 operably connecting first mode fork 154 to sector plate 170, and a second spring-biased shift assembly 176 operably connecting second mode fork 156 to sector plate 170. To control movement of range sleeve 92, a follower pin 178 is fixed to rail 162 and has a roller 180 retained in a range slot 182 formed in sector plate 170. The contour of range slot 182 functions to cause bidirectional sliding movement of rail 162 in response to bi-directional rotation of sector plate 170.

As best seen from FIG. 4, first shift assembly 174 includes a bracket 184 having end flanges 186 journalled on rail 162, a spring 188 acting between one end flange 186 and first mode fork 154, and a follower pin 190 fixed to bracket 184 and having a roller 192 retained in a first mode slot 194 formed in sector plate 170. The contour of first mode slot 194 functions to cause bidirectional sliding movement of first mode fork 154 on rail 162 in response to bi-directional rotary movement of sector plate 170. Spring 188 is operable to normally bias first mode fork 154 toward its 2WD position. Second shift assembly 176 includes a bracket 196 having end flanges 198 journalled on rail 162, a pair of springs 200 acting between end flanges 198 and ends of second mode fork 156, and a follower pin 202 fixed to bracket 196 and having a roller 204 retained in a second mode slot 206 formed in sector plate 170. The contour of second mode slot 206 functions to cause bi-directional sliding movement of second mode fork 156 on rail 162 in response to bi-directional rotary movement of sector plate 170. Actuator 160 can be any suitable power-operated device, such as a gearmotor/encoder 210, operable to rotate actuator shaft 172 and sector plate 170 in response to mode signals sent from a operator-actuated mode shift device 212 (i.e., lever, push-buttons, rotary switches, etc.) for establishing a desired drive mode. Alternatively, a mechanical linkage assembly could be connected to actuator shaft 172 for permitting manual shifting between the available drive modes.

Figure 5:
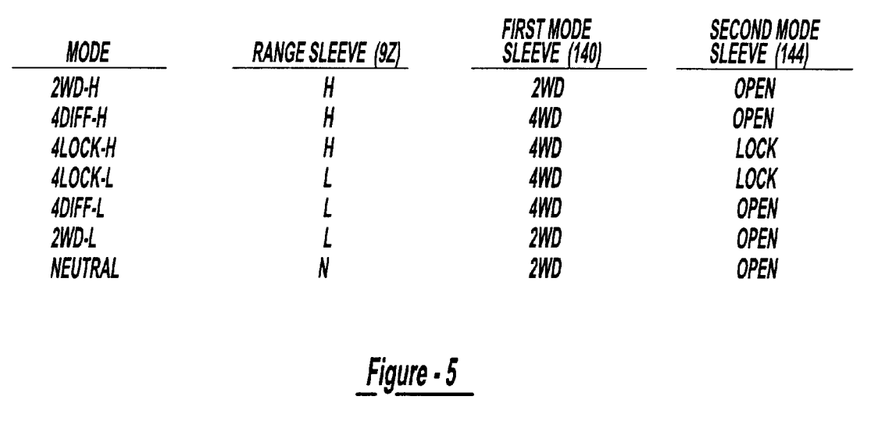
FIG. 5 is a table listing the position of movable range and mode clutch for establishing a combination of speed ranges and drive modes available with the transfer case shown in FIGS. 2 through 4.

Referring to FIG. 5, a table is provided listing the combination of range positions of range sleeve 92 and mode positions of first mode sleeve 140 and second mode sleeve 142 for sequentially establishing a number of different drive modes made available by transfer case 20. In particular, a two-wheel high-range drive mode (2WD-H) is established with range sleeve 92 in its H position, first mode sleeve 140 in its 2WD and second mode sleeve 142 in its OPEN position. A full-time four-wheel high-range drive mode (4DIFF-H) is established by shifting first mode sleeve 140 to its 4WD position while second mode sleeve 142 is maintained in its OPEN position and range sleeve 92 is maintained in its H position. A locked four-wheel high-range drive mode (4LOCK-H) is established by moving second mode sleeve 142 to its LOCK position while first mode sleeve 140 is maintained in its 4WD position and range sleeve 92 again is maintained in its H position. A locked four-wheel low-range drive mode (4LOCK-L) is established by moving range sleeve 92 to its L position while maintaining first mode sleeve 140 in its 4WD position and second mode sleeve 142 in its LOCK position. A full-time four-wheel low-range drive mode (4DIFF-L) is established by moving second mode sleeve 142 to its OPEN position while first mode sleeve 140 is maintained in its 4WD position and range sleeve 92 is maintained in its L position. A two-wheel low-range drive mode (2WD-L) is established by moving first mode sleeve 140 to its 2WD position while second mode sleeve 142 is maintained in its OPEN position and range sleeve 92 is maintained in its L position. Finally, a Neutral mode is established by moving range sleeve 92 to its N position while first mode sleeve 140 is maintained in its 2WD position and second mode sleeve 142 is maintained in its OPEN position. While the above sequence of drive mode requires movement of only one of range sleeve 92 and first and second mode sleeves, 140 and 142, respectively, for selection of the next drive mode, the invention is not limited to such a sequence nor is it necessary that all seven of the drive modes be made available. In particular, the number of drive modes made available for selection via actuation of shift operator 212 can be selected based on the particular requirements of each different vehicular application.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly including first and second planetary gearsets having a common carrier assembly, said first planetary gearset including a first sun gear, a ring gear, and a first planet gear rotatably supported by said carrier assembly and meshed with said first sun gear and said ring gear, said second planetary gearset including a second sun gear coupled for rotation with said rear output shaft, a third sun gear coupled for rotation with said front output shaft, a second planet gear rotatably supported by said carrier assembly and meshed with said second sun gear, and a third planet gear rotatably supported by said carrier assembly and meshed with said third sun gear and said second planet gear; and a clutch for selectively coupling said ring gear to said first sun gear for driving said carrier assembly at a first speed ratio relative to said input shaft for establishing a full-time four-wheel high-range drive mode, and said clutch is further operable for selectively coupling said ring gear to said housing for driving said carrier assembly at a second speed ratio relative to said input shaft for establishing a fulltime four-wheel low-range drive mode.

2. The transfer case of claim 1 wherein said clutch is a synchronizer clutch operable for causing speed synchronization between said input shaft and said ring gear, and said synchronizer clutch is further operable for causing speed synchronization between said ring gear and said housing.

3. The transfer case of claim 1 wherein said clutch includes a range sleeve movable from a neutral position to a high-range position and a low-range position, said range sleeve is operable in said high-range position to couple said ring gear with said first sun gear and in said low-range position to couple said ring gear with said housing, and said range sleeve is operable in said neutral position to uncouple said ring gear from both of said first sun gear and said housing for establishing a Neutral non-driven mode.

4. The transfer case of claim 3 wherein said clutch includes a first synchronizer operable for inhibiting movement of said range sleeve to said high-range position until speed synchronization is established between said ring gear and said first sun gear, and a second synchronizer operable for inhibiting movement of said range sleeve to said low-range position until speed synchronization is established between said ring gear and said housing.

5. The transfer case of claim 4 wherein said clutch includes a neutral hub fixed for rotation with said ring gear and on which said range sleeve is supported for rotation therewith and sliding movement thereon between said high-range, low-range and neutral positions, a range clutch plate fixed to said first sun gear, and a brake plate fixed to said housing, wherein said first synchronizer is disposed between said neutral hub and said range clutch plate for inhibiting movement of said range sleeve into said high-range position whereat said range sleeve is coupled to said range clutch plate until speed synchronization is established therebetween, and wherein said second synchronizer is disposed between said neutral hub and said brake plate for inhibiting movement of said range sleeve to said low-range position whereat said range sleeve is coupled to said brake plate until speed synchronization is established therebetween.

6. The transfer case of claim 1 further comprising a second clutch operably disposed between said front and rear output shafts and which is operable in a first mode for permitting speed differentiation between said front and rear output shafts, said second clutch is further operable in a second mode for preventing speed differentiation between said front and rear output shafts.

7. The transfer case of claim 6 wherein said second clutch includes a first mode sleeve operable in a 4WD position and a second mode sleeve movable between a DIFF position and a LOCK position, said second mode sleeve is operable in said DIFF position to uncouple said third sun gear from said rear output shaft so as to establish said first mode, and said mode sleeve is operable in said LOCK position to couple said third sun gear to said rear output shaft so as to establish said second mode.

8. The transfer case of claim 7 wherein said second clutch includes a synchronizer operably disposed between said third sun gear and said rear output shaft for inhibiting movement of said first mode sleeve from said 2WD position to said 4WD position until speed synchronization is established therebetween.

9. The transfer case of claim 6 wherein said second clutch is further operable in a third mode for disconnecting said front output shaft from said third sun gear.

10. The transfer case of claim 9 wherein said second clutch is a synchronizer clutch operable for causing speed synchronization between said front output shaft and said third sun gear in response to shifting from said third mode into said first mode.

11. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly including first and second planetary gearsets having a common carrier assembly, said first planetary gearset including a first sun gear, a ring gear, and a first planet gear rotatably supported by said carrier assembly and meshed with said first sun gear and said ring gear, said second planetary gearset including a second sun gear coupled for rotation with said rear output shaft, a third sun gear coupled for rotation with said front output shaft, a second planet gear rotatably supported by said carrier assembly and meshed with said second sun gear, and a third planet gear rotatably supported by said carrier assembly and meshed with said third sun gear and said second planet gear;

a first clutch for selectively coupling said ring gear to said first sun gear to drive said carrier assembly at a first speed ratio relative to said input shaft for establishing a high-range drive mode, and said first clutch is further operable for selectively coupling said ring gear to said housing to drive said carrier assembly at a second speed ratio relative to said input shaft for establishing a low-range drive mode; and a second clutch operably disposed between said front and rear output shafts and which is operable in a first mode for permitting speed differentiation between said front and rear output shafts to establish a full-time four-wheel drive mode, said second clutch is further operable in a second mode for preventing speed differentiation between said front and rear output shafts to establish a locked four-wheel drive mode.

12. The transfer case of claim 11 wherein said first clutch is a synchronizer clutch operable for causing speed synchronization between said ring gear and said first sun gear, and said synchronizer clutch is further operable for causing speed synchronization between said ring gear and said housing.

13. The transfer case of claim 11 wherein said second clutch is a synchronizer clutch operable for causing speed synchronization between said third sun gear and said front output shaft in response to shifting from said third mode into said first mode.

14. The transfer case of claim 11 wherein said second clutch is operable in a third mode for disconnecting said front output shaft from said third sun gear to establish a two-wheel drive mode.

15. The transfer case of claim 11 wherein said first clutch includes a range sleeve movable from a neutral position to a high-range position and a low-range position, said range sleeve is operable in said high-range position to couple said ring gear for rotation with said first sun gear and in said low-range position to couple said ring gear with said housing, and said range sleeve is operable in said neutral position to uncouple said ring gear from both of said first sun gear and said housing to establish a Neutral non-driven mode, wherein said first clutch includes a first synchronizer operable for inhibiting movement of said range sleeve to said high-range position until speed synchronization is established between said ring gear and said first sun gear, and a second synchronizer operably disposed between said first sun gear and said input shaft for inhibiting movement of said range sleeve to said low-range position until speed synchronization is established between said ring gear and said housing.

16. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly including first and second planetary gearsets having a common carrier assembly, said first planetary gearset including a first sun gear, a ring gear, a first planet gear rotatably supported by said carrier assembly and meshed with said first sun gear and said ring gear, said second planetary gearset including a second sun gear coupled for rotation with said rear output shaft, a third sun gear, a second planet gear rotatably supported by said carrier assembly and meshed with said second sun gear, and a third planet gear rotatably supported by said carrier assembly and meshed with said third sun gear and said second planet gear;

a range sleeve movable between a high-range position coupling said ring gear for rotation with said first sun gear, a low-range position coupling said ring gear with said housing, and a neutral position uncoupling said ring gear from both of said first sun gear and said housing; and a first mo de sle eve movable between a 2WD position and a 4WD position coupling said third sun gear to said front output shaft a second mode sleeve movable between an OPEN position and a LOCK position coupling said third sun gear to said rear output shaft.

17. The transfer case of claim 16 further comprising a first synchronizer that is operable for inhibiting movement of said range sleeve to said high-range position until speed synchronization is established between said ring gear and said first sun gear, and a second synchronizer that is operable for inhibiting movement of said range sleeve to said low-range position until speed synchronization is established between said ring gear and said housing.

18. The transfer case of claim 17 further comprising a third synchronizer that is operably disposed between said third sun gear and said front output shaft for inhibiting movement of said first mode sleeve from said 2WD position to said 4WD position until speed synchronization is established therebetween.

19. The transfer case of claim 16 further comprising a synchronizer that is operably disposed between said third sun gear and said front output shaft for inhibiting movement of said first mode sleeve from said 2WD position to said 4WD position until speed synchronization is established therebetween.

20. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly including first and second planetary gearsets having a common carrier assembly, said first planetary gearset including a first sun gear, a ring gear, a first planet gear rotatably supported by said carrier assembly and meshed with said first sun gear and said ring gear, said second planetary gearset including a second sun gear coupled for rotation with said rear output shaft, a third sun gear, a second planet gear rotatably supported by said carrier assembly and meshed with said second sun gear, and a third planet gear rotatably supported by said carrier assembly and meshed with said third sun gear and said second planet gear;

a first clutch for selectively coupling said ring gear to said first sun gear to drive said carrier assembly at a first speed ratio relative to said input shaft for establishing a high-range drive mode, and said first clutch is further operable for selectively coupling said ring gear to said housing to drive said carrier assembly at a second speed ratio relative to said input shaft for establishing a low-range drive mode; and a second clutch is operable in a first mode for selectively coupling said third sun gear to said front output shaft to permit speed differentiation between said front and rear output shafts and establish a full-time four-wheel drive mode, and said second clutch is further operable in a second mode for selectively coupling said third sun gear to said front output shaft and said rear output shaft to prevent speed differentiation therebetween and establish a locked four-wheel drive mode.

21. The transfer case of claim 20 wherein said first clutch is a synchronizer clutch operable for causing speed synchronization between said ring gear and said first sun gear, and said synchronizer clutch is further operable for causing speed synchronization between said ring gear and said housing.

22. The transfer case of claim 20 wherein said second clutch is further operable in a third mode to establish a two-wheel drive mode.

23. The transfer case of claim 22 wherein said second clutch is a synchronizer clutch operable for causing speed synchronization between said third sun gear and said front output shaft in response to shifting from said third mode into said first mode.

* * * * *